(12) United States Patent
Chavan Dafle et al.

(10) Patent No.: US 11,396,431 B2
(45) Date of Patent: Jul. 26, 2022

(54) ROBOTIC MANIPULATION OF OBJECTS FOR GRIP ADJUSTMENT

(71) Applicant: Massachusetts Institute of Technology, Cambridge, MA (US)

(72) Inventors: Nikhil Chavan Dafle, Cambridge, MA (US); Alberto Rodriguez Garcia, Cambridge, MA (US); Rachel Holladay, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 304 days.

(21) Appl. No.: 16/542,720

(22) Filed: Aug. 16, 2019

(65) Prior Publication Data
US 2020/0055680 A1      Feb. 20, 2020

Related U.S. Application Data

(60) Provisional application No. 62/765,278, filed on Aug. 20, 2018.

(51) Int. Cl.
*B25J 15/00*      (2006.01)
*B65G 61/00*      (2006.01)
(Continued)

(52) U.S. Cl.
CPC .............. *B65G 61/00* (2013.01); *B25J 9/12* (2013.01); *B25J 9/1612* (2013.01); *B25J 9/1633* (2013.01);
(Continued)

(58) Field of Classification Search
CPC ...... B65G 61/00; B65G 47/905; B25J 9/1055; B25J 9/12; B25J 9/1612; B25J 9/1633; B25J 9/1664; B25J 15/00; B25J 15/0004
See application file for complete search history.

(56) References Cited

U.S. PATENT DOCUMENTS 4,740,025 A * 4/1988 Nelson ...................... B01L 9/50
                                                      294/902
10,005,627 B2   6/2018 Girtman et al.
(Continued)

FOREIGN PATENT DOCUMENTS

EP         0076135 A2 *   9/1982   ................ B25J 9/00

OTHER PUBLICATIONS

Kot et al., Gripper with precisely adjustable gripping force, 2017, IEEE, p. 555-559 (Year: 2017).*
(Continued)

*Primary Examiner* — McDieunel Marc
(74) *Attorney, Agent, or Firm* — Wolf, Greenfield & Sacks, P.C.

(57) ABSTRACT

Embodiments described herein relate to systems and methods for adjusting a grip on an object held by a gripper of a robotic system. The gripper manipulates the object to bring a portion of the object into contact with a supporting surface underlying the object, and the gripper undergoes one or more displacements relative to the object to apply frictional pushes to the object while the object is held stationary against the supporting surface. The gripper maintains contact with the object during the one or more displacements, and the one or more displacements are at least partially directed towards the supporting surface. According to some aspects, such manipulation strategies provide a functionality of fixturing an object for regripping without requiring customized fixture hardware.

33 Claims, 10 Drawing Sheets

(51) Int. Cl.
  *B25J 9/12* (2006.01)
  *B25J 9/16* (2006.01)
(52) U.S. Cl.
  CPC ............ *B25J 9/1664* (2013.01); *B25J 15/00* (2013.01); *B25J 15/0004* (2013.01)

(56) References Cited

U.S. PATENT DOCUMENTS

| | | | |
|---|---|---|---|
| 2013/0343640 A1* | 12/2013 | Buehler | B25J 9/1697 382/155 |
| 2017/0036354 A1* | 2/2017 | Chavan Dafle | B25J 15/0042 |
| 2018/0193999 A1* | 7/2018 | Jacobsen | B25J 13/025 |

OTHER PUBLICATIONS

Khamis et al., Tactile afferents encode grip safety before slip for different frictions, 2014, IEEE, p. 4123-4126 (Year: 2014).*
International Search Report and Written Opinion for International Application No. PCT/US2019/046771 dated Jan. 6, 2020.
Invitation to Pay Additional Fees for International Application No. PCT/US2019/046771 dated Oct. 17, 2019.
[No Author Listed], RSS 2018—In-Hand Manipulation via Motion Cones (Best Student Paper Award). YouTube. Jul. 21, 2018. https://www.youtube.com/watch?v=rVDO8QMuYhc&feature=youtu.be [last accessed Mar. 11, 2020]. 51 pages.
Chavan-Dafle et al., In-hand manipulation via motion cones. arXiv preprint arXiv:1810.00219. Sep. 29, 2018:10 pages.
Chavan-Dafle et al., Sampling-based planning of in-hand manipulation with external pushes. arXiv preprint arXiv:1707.00318. Nov. 2, 2017:1-16.
Hogan et al., Feedback control of the pusher-slider system: A story of hybrid and underactuated contact dynamics. arXiv preprint arXiv:1611.08268. Nov. 24, 2016:1-16.
Kolbert et al., Experimental validation of contact dynamics for in-hand manipulation. arXiv preprint arXiv:1702.07252. Oct. 31, 2017:1-12.
Lynch et al., Manipulation and active sensing by pushing using tactile feedback. Proceedings of the IEEE/RSJ International Conference on Intelligent Robots and Systems. Jul. 7, 1992; 1:416-421.
Lynch et al., Stable pushing: Mechanics, controllability, and planning. The International Journal of Robotics Research. Feb. 1996;15(6):533-556.
Shi et al., Dynamic in-hand sliding manipulation. IEEE Transactions on Robotics. Aug. 2017;33(4):778-795.
Xydas et al., Modeling of contact mechanics and friction limit surfaces for soft fingers in robotics, with experimental results. The International Journal of Robotics Research. Sep. 1999;18(9):941-50.
Chavan Dafle et al., Prehensile pushing: In-hand manipulation with push-primitives. In 2015 IEEE/RSJ International Conference on Intelligent Robots and Systems (IROS) Sep. 28, 2015: 9 pages.
Chavan Dafle et al., Sampling-based planning of in-hand manipulation with external pushes. CoRR, abs/1707.00318. Nov. 2, 2017:1-16.
Chavan Dafle et al., Stable prehensile pushing: In-hand manipulation with alternating sticking contacts. In 2018 IEEE International Conference on Robotics and Automation (ICRA) May 21, 2018:254-261.
Dogar et al., Push-grasping with dexterous hands: Mechanics and a method. In 2010 IEEE/RSJ International Conference on Intelligent Robots and Systems (IROS). Oct. 18, 2010:2123-2130.

* cited by examiner

ROBOTIC MANIPULATION OF OBJECTS FOR GRIP ADJUSTMENT

CROSS-REFERENCE TO RELATED APPLICATIONS

This application claims the benefit of priority under 35 U.S.C. § 119(e) of U.S. Provisional Application 62/765,278 filed Aug. 20, 2018.

FIELD

Disclosed embodiments relate to robotic systems for manipulating objects to adjust a grip on the object.

BACKGROUND

Robotic systems that grab and manipulate objects are used in various applications such as machining, assembly, and inspection. Often, a robotic system needs to change its grip on an object to perform different tasks. However, conventional robotic systems may lack the dexterity to autonomously adjust the grip on an object and must be assisted by systems such as part feeders and fixtures, which necessitates highly-customized, non-flexible, and expensive automation solutions.

SUMMARY

In one embodiment, a method for changing a grip on an object includes manipulating an object with a gripper of a robotic system to bring a first portion of the object into contact with a supporting surface vertically below the object and displacing the gripper relative to the supporting surface to frictionally push the object relative to the gripper. A direction of displacement of the gripper is at least partially directed towards the supporting surface, and the gripper maintains contact with the object during the displacement. The method further includes maintaining the object substantially stationary relative to the supporting surface during displacement of the gripper.

In another embodiment, a system for changing a grip on an object includes a gripper constructed and arranged to contact and grip an object at two or more contact points, an actuator constructed and arranged to control movement of the gripper, and a processor in communication with the actuator. The processor is configured to control the actuator to manipulate the object with the gripper to bring a first portion of the object into contact with a supporting surface vertically below the object and displace the gripper relative to the supporting surface to frictionally push the object relative to the gripper. A direction of displacement of the gripper is at least partially directed towards the supporting surface, and the gripper maintains contact with the object during the displacement. The processor is further configured to control the actuator to maintain the object substantially stationary relative to the supporting surface during displacement of the gripper.

In a further embodiment, a method for changing a grip on an object includes determining a set of physically possible and stable displacements for moving a gripper of a robotic system relative to an object while a first portion of the object is held by the gripper against a surface underlying the object. Each displacement of the set of displacements are invariant to a density of the object and a friction force between the gripper and the object. The method further includes applying a displacement to the gripper relative to the object according to one of the set of physically possible and stable displacements to frictionally push the object relative to the gripper.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. Some of the below drawings describe figures, graphs, or charts, that are further explained in the detailed description below. In the drawings.

DETAILED DESCRIPTION

Figure 1:
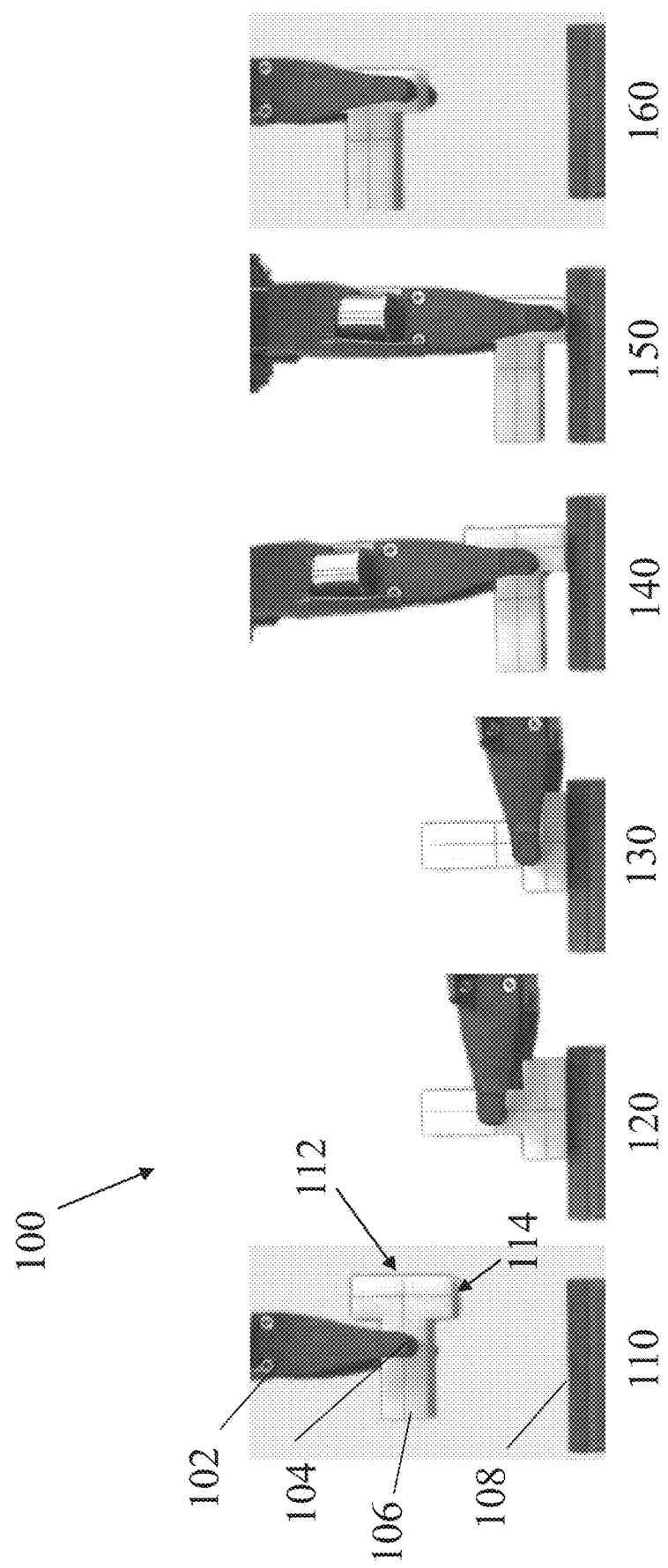
FIG. 1 is a side view showing manipulation of an object by a gripper to change the grip on the object, according to one embodiment.

As noted above, the ability for robotic systems to adjust a grip on an object is ubiquitous in various applications such as machining, assembly, and inspection. Adjusting a grip is typically accomplished through the use of one or more fixtures that impose kinematic constraints on the object, thereby allowing a gripper of the robotic system to release the object, move to a new desired grip position, and subsequently regrip the object in the desired grip position. In order to impose the required kinematic constraints, such fixtures are typically designed specifically for a particular object, such as to accommodate the object's shape, mass, frictional interactions between the object and the fixture(s), and so on. Accordingly, when the robotic system is used with different objects, different fixtures are required, which leads to increased cost for the system and reduced efficiency resulting from system downtime while the fixtures are changed for different parts.

In view of the foregoing, the inventors have recognized and appreciated numerous benefits associated with systems and methods that enable a robotic gripper to adjust its grip on an object without the need for a fixture or any other specialized hardware. According to some aspects, the systems and methods described herein provide a fixturing strategy for regrasping an object that does not use a physical fixture. For example, to regrasp an object in a gripper (i.e., to adjust a grip on the object), a robotic gripper may frictionally push the object against an external contact in the environment such that the external contact keeps the object stationary while fingers of the gripper slide along the object while it is held by the gripper. In this manner, the systems and methods described herein may provide for fixtureless fixturing of an object, in that the effect of employing a fixture is realized without requiring a physical fixture. Moreover, the inventors have appreciated that in some embodiments the systems and methods described herein may advantageously permit fixtureless fixturing of an object without requiring knowledge of the object's mass, density, inertia, and/or frictional interactions between the object and a gripper of a robotic system.

According to some aspects, a gripper of a robotic system may adjust its grip on an object (e.g., from an initial grip to a desired grip) by utilizing a fixed surface in the environment to apply frictional pushes to the gripper relative to the object. For example, in one embodiment, a gripper holding an object in an initial grip may manipulate the object to bring a portion of the object into contact with a stationary supporting surface located vertically beneath the object as defined relative to a direction of gravity. In some embodiments, the surface may be arranged such that a normal force at the surface is substantially aligned with a direction of a gravitational force acting on the object; in this manner, the surface may support the object and balance the mass of the object. The gripper may undergo one or more three-dimensional displacements relative to the object to adjust the grip from the initial grip to the desired grip, and each displacement has a non-zero component along a direction normal to the supporting surface and directed towards the supporting surface. In this manner, each displacement is directed at least partially towards the supporting surface. Moreover, during displacement of the gripper, the object is held substantially stationary relative to the supporting surface as the gripper slides along the object as the object is held by the gripper.

In some embodiments, the gripper may apply a force to the object during displacement of the gripper, and the force may be at least partially directed towards the support surface underlying the object. That is, the force may have a non-zero component along a direction normal to the surface and directed towards the surface. For example, such a force may be applied by applying a squeezing force with contacts of the gripper to generate a friction force at the contacts. In some instances, such a force applied by the gripper may aid in maintaining the object in contact with the supporting surface during displacement of the gripper relative to the object. In particular, since the force applied by the gripper is at least partially directed towards the surface, the applied force increases the normal force, and therefore the friction force between the object and the supporting surface. It should be understood that any suitable portion of the force may be directed towards the supporting surface. For example, less than 50%, greater than 50%, greater than 75%, greater than 90%, and/or any other appropriate percentage of a magnitude of a total normal force applied to the supporting surface may be applied to the object by the gripper in a direction towards the surface during a frictional push.

In some embodiments, displacing a gripper relative to an object may further include changing an orientation of the gripper relative to the object. For example, the gripper may rotate about an axis passing through points at which the gripper contacts the object. Moreover, in certain embodiments, after undergoing one or more displacements in a first orientation relative to the object and with a first portion of the object held in contact with the supporting surface, the gripper may move to a second orientation and manipulate the object to bring a second portion of the object into contact with the supporting surface. The gripper may subsequently undergo one or more displacements with the second portion of the object held against the supporting surface. Without wishing to be bound by theory, such a reorientation of the gripper and object relative to the supporting surface may allow the gripper to undergo various displacements relative to the object that would not be physically possible and/or stable with the first portion of the object held in contact with the supporting surface. Accordingly, by suitably reorienting the gripper and object relative to the supporting surface, the robotic system may achieve any desired adjustment in the grip.

According to some aspects, methods described herein may comprise determining a set of physically possible and stable displacements for moving a gripper relative to an object using one or more frictional pushes while the object is held by the gripper against a surface underlying the object. The displacements may be performed in a three dimensional environment. Further, in some embodiments, the set of physically possible and stable displacements may be invariant to the density of the object as well as the friction force between the gripper and the object. A displacement may be selected from the set, and the gripper may be moved relative to the object according to the selected displacement to apply a frictional push to the object relative to the gripper.

As used herein, a physically possible and stable displacement applied using a frictional push may refer to a pushing displacement that is capable of being applied to the object to displace the object relative to a gripper it is held in such that the gripper slides along the object while the object remains substantially stationary, i.e. not slipping, relative to a surface the object is positioned against due to the effects of friction between the object and surface. However, it should be understood that some amount of slippage of the object relative to the surface may occur, but a magnitude of this slippage may be substantially less than a magnitude of movement of the object relative to the gripper during a frictional push.

In some implementations, a set of physically possible and stable displacements of a gripper may be determined in a reference frame of the object, and the displacements of the gripper may be described as frictional pushes applied to the object by the surface underlying the object to displace the object relative to the gripper. While the surface may in fact be fixed in place in the environment, determining the set of displacements in the reference frame of the gripper may allow the set of displacements to be described by a set of robust motion cones comprising a range of physically possible and stable pushes that the surface may apply to the object while maintaining substantially stationary contact between the object and the surface. Accordingly, in some implementations described herein, the surface underlying the object may be referred to as a pusher. However, it should be understood that a pusher may refer to any appropriate supporting surface that an object may be placed on and where a relative displacement between the gripper and the supporting surface may be applied to provide the desired frictional push to the object while maintaining the object substantially stationary relative to the supporting surface.

Without wishing to be bound by theory, the concept of a motion cone abstracts the dynamics of pushing and provides direct bounds on the object motions that can be achieved while keeping the pusher contact sticking to the object. In particular, a motion cone is a set of feasible motions that a rigid body can follow under the action of a frictional push applied to the object by a frictional contact. A robust motion cone refers to a subset of motion cones such that the robust motion cone is invariant to all of the parameters of a particular system including a gripper, object, and surface (such as the mass, density, and inertia of the object, as well as the friction between the gripper and object, a grasping force applied by the gripper, and other appropriate parameters) except the friction between the object and the surface (i.e., at the pusher contact).

In some embodiments, adjusting a grip on an object with a gripper may include calculating a series of robust motion cones, and iteratively sampling physically possible and stable displacements from the robust motion cones to plan a sequence of displacements that can move a gripper from a first position and/or orientation (e.g., corresponding to an initial grip on the object) to a second position and/or orientation (e.g., corresponding to a desired or goal grip on the object).

As noted above during each displacement of the gripper relative to the object, at least one portion of the object may be held in substantially stationary contact with an underlying surface. The portion of the object in contact with the surface may define a contact area. For example, the portion of the object in contact with the underlying surface may be a planar surface of the object, and the contact area may correspond to the entire area of the planar surface that is physically in contact with the surface. In some instances, the portion of the object in contact with the underlying surface may include a plurality of contact points that may define a polygonal contact area, and in such instances, only the contact points may be in physical contact with the surface. As such, it should be understood that the contact area may correspond to a projected area of the object on the surface such that the contact area and underlying surface are coplanar. In some embodiments, the set of physically possible and stable displacements that may be applied to move the gripper relative to the object may be selected and applied such that at least a portion, and in some instances substantially all, of an axis extending between two contacts of a gripper contacting and gripping the object may be located within a volume extending vertically above the contact area during a frictional push of the object.

According to some aspects, the methods described herein may be implemented in a robotic system including a gripper constructed and arranged to contact an object at two or more contact points, and an actuator constructed and arranged to control movement of the gripper. The system may further include a processor with associated memory, such as a non-transitory computer readable storage medium, in communication with the actuator. The memory may have instructions as described herein that when executed by the processor control the actuator to implement the methods described herein, such as to adjust a grip on an object by displacing the gripper relative to an underlying surface to apply one or more frictional pushes to the object.

It should be understood that in some instances, a displacement of a gripper relative to an object while the object is held against a surface can equivalently be described in the reference frame of the gripper as a push applied to the object by the surface. Accordingly, a grip adjustment as described herein may be achieved by applying one or more displacements to the gripper relative to the object (in the reference frame of the object and surface) or by applying one or more pushes to the object with the surface (in the reference frame of the gripper). As such, in some instances, the surface may be described herein as a pusher.

According to some aspects, the mechanics of frictional pushing may be exploited to characterize a convex polyhedral set of pushes that results in fixtureless fixturing. These frictional pushes may be robust against uncertainty in the object inertia, grasping force, and the friction at the contacts between an object and a gripper. A sampling-based planner may use the sets of robust pushes to rapidly build a tree of reachable grasps. A path in this tree may correspond to a pushing strategy to regrasp an object, and may include pushes from different sides. These pushing strategies may be used to move the object to a desired pose in the grasp of a gripper irrespective of any uncertainty in the object inertia, grasping force, or friction at the fingers.

In some embodiments, the efficient computation of motion cones and their application to propagate the dynamics may allow the presently disclosed planner to generate the pushing strategies in less than a second. Moreover, the planner can use and reuse a simple feature in the environment, such as a fixed surface, to manipulate many different objects.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 depicts a series of frames 100 showing a gripper 102 changing a grip on an object 106. As shown in frame 110, the gripper 102 engages and compresses the object 106 between a pair of fingers with contacts 104 on opposing sides of the object to grasp the object in an initial grip. As shown in frame 120, the gripper 102 may manipulate the object 106 to bring a first portion 112 of the object into contact with a surface 108 positioned vertically beneath the object. Frame 130 depicts an intermediate configuration after the gripper 102 has undergone a displacement relative to the object 106 with the first portion 112 held in a stationary contact against the surface 108. Frame 140 shows another intermediate configuration after the gripper 102, has manipulated the object 106 to bring a second portion 114 into contact with the surface 108, after which the gripper undergoes subsequent displacement toward the surface 108 to achieve the desired grip shown in frame 150. Once in the desired grip, the gripper moves the object away from the surface as shown in frame 160.

Figure 2B:
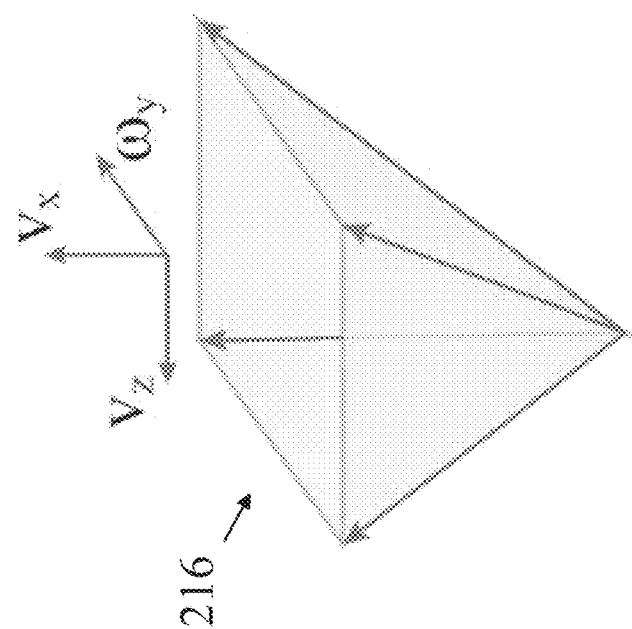
FIG. 2B is a perspective view of the motion cone of FIG. 2A.
Figure 2A:
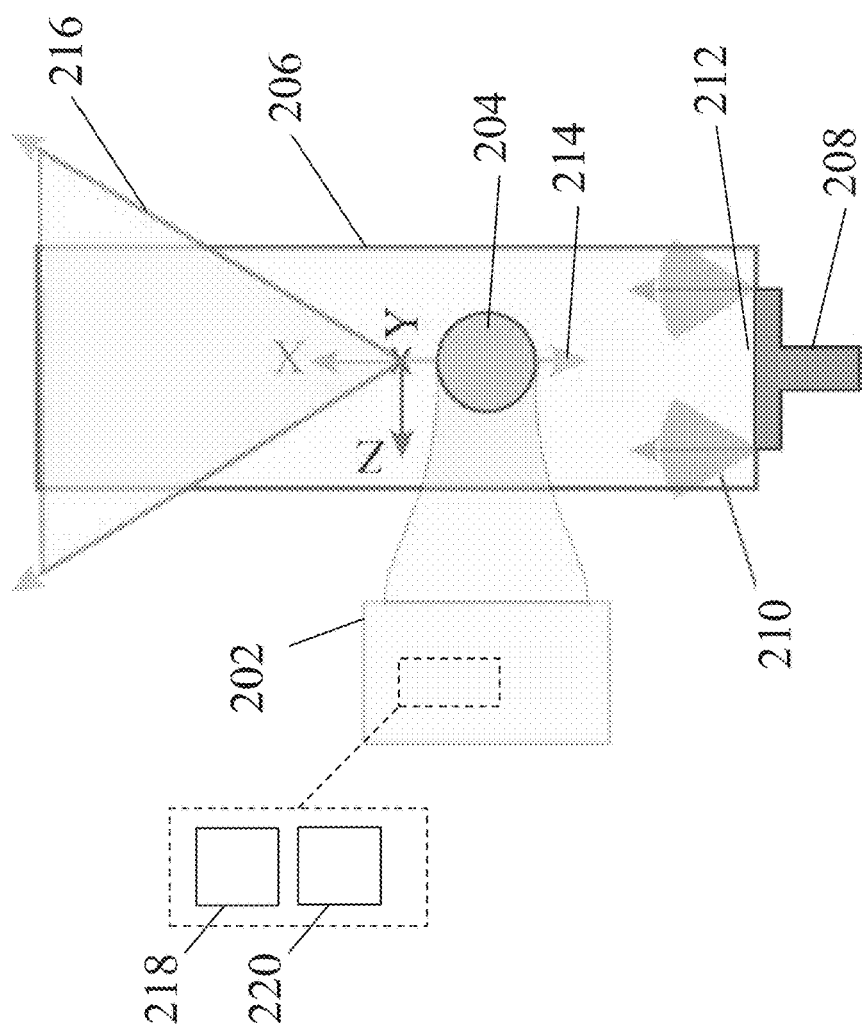
FIG. 2A is a schematic side view showing an object held in a gripper against a surface along with a motion cone resulting from frictional forces applied to the object, according to one embodiment.

FIG. 2A shows a schematic side view of an object 206 held in a gripper 202 between a pair of contacts 204 located on opposing sides of the object. The object 206 is held in contact with a surface 208 located vertically beneath the object. The object is specifically in contact with the surface 208 along a contact area 212. A gravitational force 214 acts on the center of mass of the object 206 and is directed vertically downwards towards the underlying surface. The depicted embodiment is drawn in the reference frame of the gripper 202, such that the surface 208 may be considered to be a pusher that can apply frictional pushes to the object 206 relative to the gripper contacts 204. In this reference frame, the surface may apply an external frictional push to the object along directions lying in the friction cones 210, resulting in a displacement of the object 206 along a direction within a motion cone 216. FIG. 2B depicts a three-dimensional view of the motion cone 216 shown in FIG. 2A. Moreover, the gripper may be part of a robotic system, and may include a processor 218 and one or more actuators 220 that are controlled by the processor to control a position and/or orientation of the gripper 202 during operation.

Figure 3:
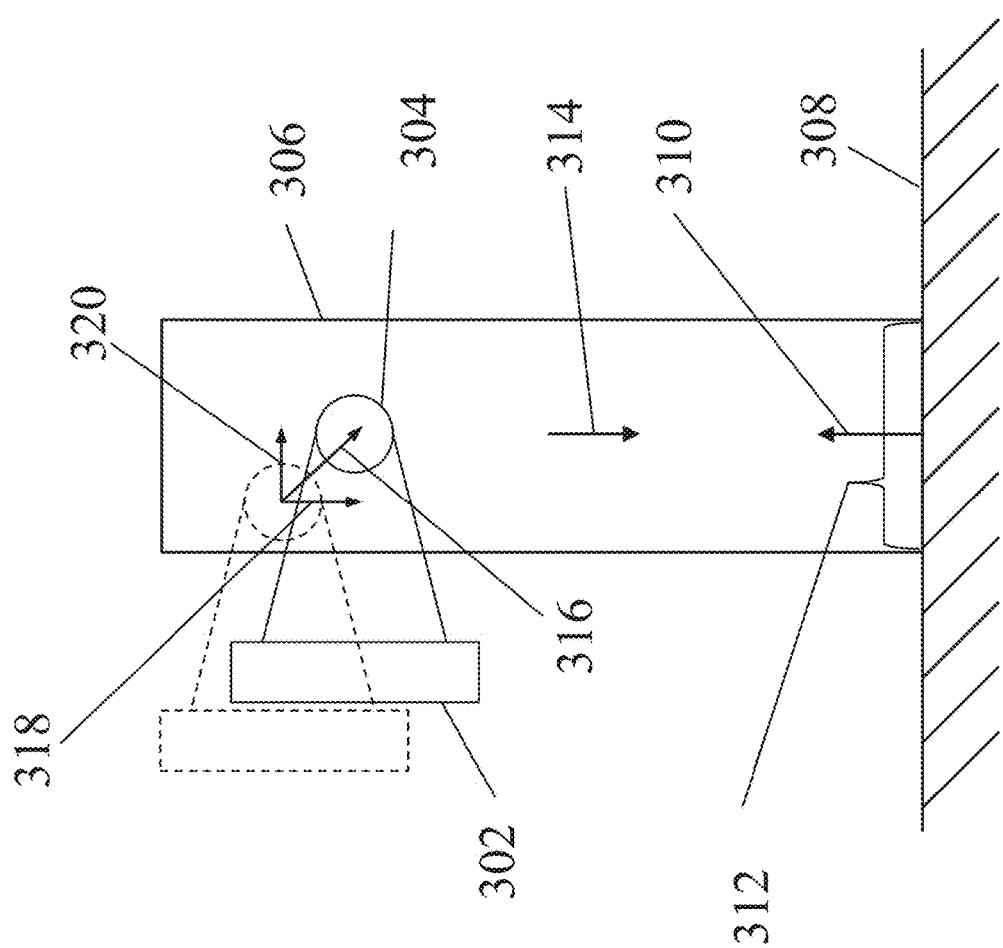
FIG. 3 is a schematic side view showing an object held against a surface while a gripper displaces relative to the object, according to one embodiment.

FIG. 3 shows a schematic side view of another embodiment including an object 306 held in contact against a surface 308 located vertically beneath the object. Contact between the object 306 and a portion of the surface 308 defines a contact area 312. In the depicted embodiment, a direction 310 normal to the surface is aligned with a direction of a gravitational force 314 acting on the object 306. In this manner, the normal force applied by the surface may balance the gravitational force of the object.

The depicted embodiment shows a gripper 302 that is grasping the object 306 via contacts 304 while the object is undergoing a displacement from a first position (dashed) to a second position (solid). The displacement of the gripper is along a direction 316, which includes vertical and horizontal displacement components 318 and 320 respectively. As illustrated, the displacement 316 of the gripper is directed at least partially towards the surface 308. In particular, the vertical component 318 of the displacement, which is parallel to the surface normal 310, is non-zero and is directed towards the surface. Moreover, as illustrated, the displacement includes a component directed towards the contact area 312, and an axis extending between contacts of the gripper used to grip the object may be at least partially, and in the depicted embodiment completely, within a volume extending vertically above the contact area 312 during the applied frictional push. Positioning and moving the gripper within the region associated with the contact area may help to make the applied displacement insensitive to changes in the previously noted physical parameters including object mass and friction between the object and grippers. Again, this may help to provide a more robust reliable system and method for adjusting a grasp of the gripper relative to the object.

Figure 4:
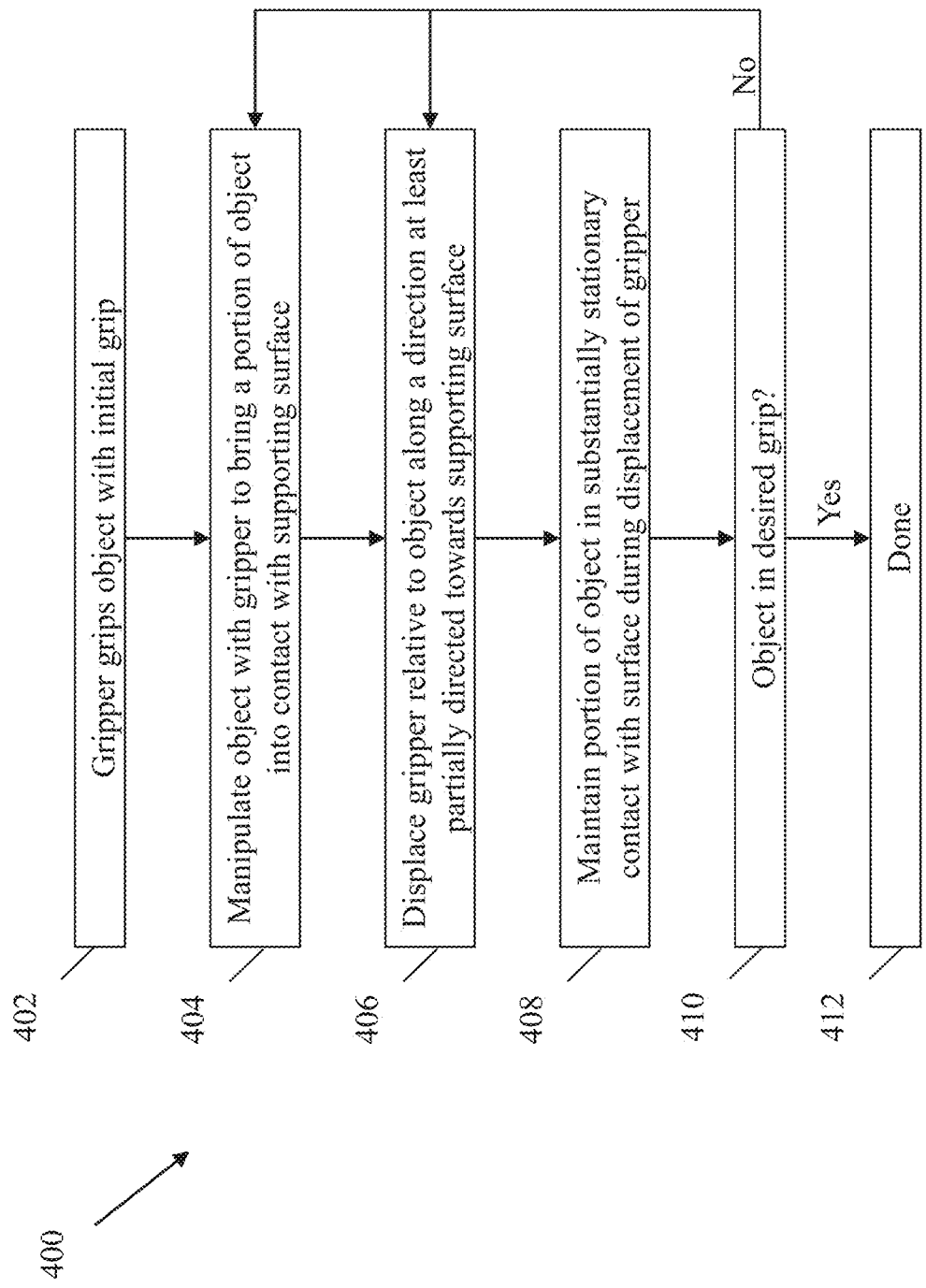
FIG. 4 is a schematic flow diagram of a method of changing a grip on an object, according to on embodiment.

Referring now to FIG. 4, one embodiment of a method 400 of changing a grip on an object is described in more detail. For example, the method may be used to change the grip from an initial grip to a desired grip. At step 402, the gripper may grasp an object in a gripper of a robotic system in an initial grip. At step 404, the gripper manipulates the object to bring a first portion of the object into contact with a supporting surface. At step 406, the gripper is displaced relative to the object along a direction that is at least partially directed towards the supporting surface to apply a frictional push to the object, and as shown at step 408, the object is maintained in substantially stationary contact with the supporting surface during displacement of the gripper. As described above, in some instances, displacing the gripper may include changing an orientation of the gripper relative to the object, such as by rotating the gripper. The method further includes checking to see if the object is in the desired grip, as shown at step 410. If the object is in the desired grip, the method completes at step 412. If the object is not in the desired grip, the method may include repeating steps 406, 408, and 410 to apply additional displacements to the gripper in either the same, or different, directions. Moreover, in some instances, the method may include repeating step 404 to manipulate the object relative to the surface and bring different portions of the object into contact with the surface to enable frictional pushes in other directions that are not physically possible and/or stable using the first orientation of the object relative to the surface. Similar to the above, additional displacements may be applied to the gripper while these different portions are held in contact with the surface.

Figure 5:
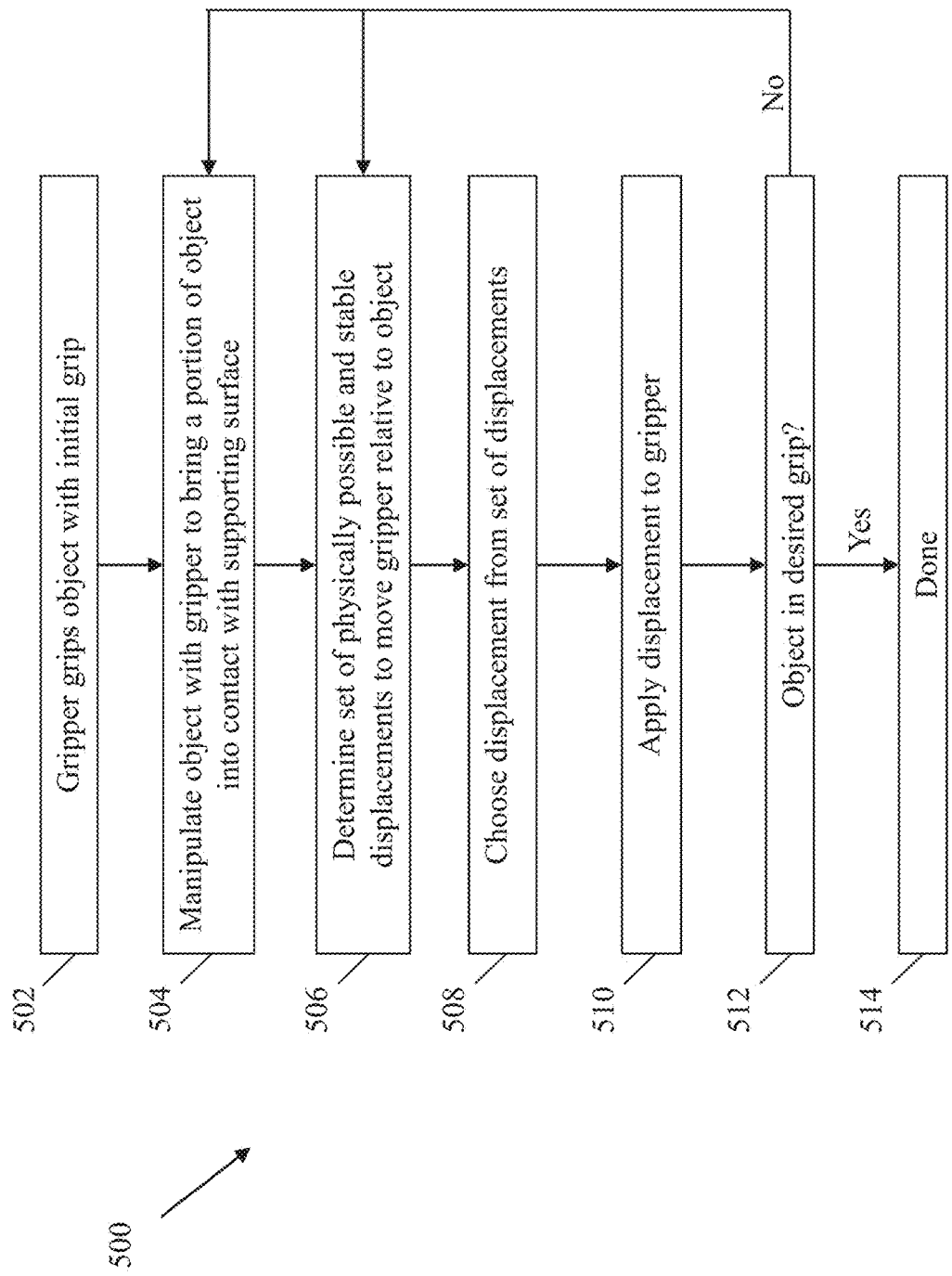
FIG. 5 is a schematic flow diagram of a method of changing a grip on an object with a gripper that includes determining a set of physically possible and stable displacements to be applied to the gripper, according to one embodiment.

Another embodiment of a method for changing a grip of a gripper on an object is now described in connection with FIG. 5. In this embodiment, similar to the embodiment described above, the gripper grips the object with an initial grip at step 502, and the method may be used to change the grip on the object to achieve a desired grip. At step 504 the gripper manipulates the object to bring a portion of the object into contact with a supporting surface, such as a surface directly underlying the object. At step 506, a set of physically possible and stable displacements to move the gripper relative to the object are determined. For example, determining the set of physically possible and stable displacements may include calculating a robust motion cone containing feasible movements of the gripper relative to the object such that the object remains in contact with the surface. At step 508, a displacement is chosen form the set of displacements, for example, by using a suitable iterative random sampling process as described herein. At step 510 the chosen displacement is applied to the gripper, and at step 512, the grip of the object is compared to the desired grip. If the object is in the desired grip, the method completes at step 514. If the object is not in the desired grip, the method may return to step 506 and determine a new set of physically possible and stable displacements to move the gripper relative to the object. Moreover, in some instances, the method may include repeating step 504 to manipulate the object and bring a different portion of the object into contact with the surface, and subsequently calculating a new set of physically possible and stable displacements.

In some implementations, one or more displacements of a gripper relative to an object may be planned to achieve a desired grip. For instance, the methods and systems described herein may be used to generate a sequence of displacements of the gripper relative to the object that, when executed in order, achieve the desired grip. Thus, in some embodiments, the methods and systems described herein may be used to generate the sequence of displacements corresponding to sets of physically possible and stable displacements at one or more intermediate positions of the gripper between the initial and desired grips, and the sequence may be subsequently executed to change the grip. It should be understood that these sequences may either be pregenerated using known part geometries and other appropriate operating parameters and/or a robotic system may determine and apply the sequences of displacements in real-time using appropriate sensors and feedback control systems as the disclosure is not limited to any particular type of implementation.

EXAMPLES

What follows are example procedures with included calculations that may be used in accordance with some embodiments of the methods and/or systems set forth in the present disclosure. The calculations described below are non-limiting, as any suitable calculations may be used in accordance with the present disclosure, but simply demonstrate a procedure which may be followed in accordance with some embodiments of the present methods and/or systems.

A robust in-hand manipulation technique using a simple parallel jaw gripper is presented herein. An object in a gripper is forced to a desired pose in the grasp using prehensile pushes. The prehensile pushes are implemented by pushing the object against features in the environment. If provided with a dual-arm robot or a multi-finger gripper, the second arm or the extra fingers of the gripper can be used for the pushes.

A manipulation planning framework is described in these examples that is compatible with several of the practical implementations for the prehensile pushes. It is considered that an object is grasped in a gripper that is fixed in the world. A moving pusher pushes the object to a new pose in the grasp. In some implementations, the pusher motion is a reflection of the robot motion against the fixed environment. Thus, planning the robot motion to regrasp an object is equivalent to finding a pushing strategy that forces the object to the desired pose.

The following knowledge may be assumed about the physical properties of a manipulation system: the object geometry; the initial and goal poses of an object in a grasp, as specified by the locations and geometries of each finger's contacts, and a discrete set of pusher contacts as specified by their locations and geometries; and coefficients of friction at the pusher contacts (an approximate value may be sufficient)

The planning framework described herein incorporates two levels. At the high-level, a T-RRT* based planning architecture may sample the configuration space of different grasps. At the low level, a planning tree may be grown in the direction of the sampled poses using the knowledge of local reachable poses in the form of robust motion cones. Exploiting the efficient dynamics propagation via motions cones, a planner may rapidly explore the configuration space and generate feasible pushing strategies to move the object in the grasp.

Contact Modeling Approach:

A review of fundamental contact modeling techniques that allow for modeling the force-motion interaction during prehensile pushing is provided below. Based on the contact modeling and dynamics of stable prehensile pushing discussed hereinafter, the mechanics of fixtureless fixturing are discussed and the set of fixtureless fixturing pushes are characterized. In the present example, it is assumed that all bodies are rigid and all contacts have dry isotropic friction.

Limit Surface:

As used herein, a limit surface refers to the boundary of the friction wrenches (force-torque pairs) that a contact with finite area can provide. The limit surface geometry can be approximated as an ellipsoid. The ellipsoidal approximation to the limit surface was assumed in order to model the force-motion interaction between an object and finger contacts.

Let $w_c=[f_x,f_z,m_y]$ be a frictional wrench at a finger contact in the contact frame. The ellipsoidal limit surface constraint can be written as: $w_c^T A w_c = 1$, where $A=\text{Diag}(a_1^{-2}, a_2^{-2}, a_3^{-2})$. For isotropic friction, the maximum friction force is $a_1=a_2=\mu_c N$, where $\mu_c$ is the friction coefficient, and N is the normal force at the contact. The maximum friction torque about the contact normal is $a_3=rc\mu_c N$, where r is the radius of the finger contact and $c \in [0.1]$ is the constant from numerical integration. For a uniform pressure distribution, c is about 0.6. When the object slides on the contact, the friction wrench lies on the limit surface such that the normal to the limit surface is in the direction of the object motion at the contact. If the object twist (linear and angular velocity pair), $v_{obj}=[v_x,v_z,w_y]^T$, is known, the friction wrench at the contact can be found as:

$$w_c = \frac{A^{-1} v_{obj\_c}}{\sqrt{v_{obj\_c}^T A^{-1} v_{obj\_c}}} = \mu_c N \bar{w}_c \quad (1)$$

where $v_{obj\_c}$ is the twist of the object in the contact frame. Here, $v_{obj\_c}=[v_{x\_c},v_{z\_c},w_{y\_c}]^T=\tilde{J}_c \cdot v_{obj}$, where $\tilde{J}_c$ is the Jacobian that maps the velocity from the object frame to the contact frame, $\bar{w}_c=[\bar{f}_x,\bar{f}_z,\bar{m}_y]^T$ is a unit wrench on the limit surface and is scaled by maximum linear friction at the contact ($\mu_c N$) to estimate the net frictional wrench.

For the ellipsoidal limit surface assumption, the linear velocity $[v_{x\_c},v_{z\_c}]^T$ of the object in the contact frame is parallel and opposite to the linear frictional force $[\bar{f}_x,\bar{f}_z]^T$ applied by the contact in the contact frame. Moreover, the relationship between the friction wrench and the normal to the limit surface, which defines the motion direction, sets the following constraint between the angular velocity at the contact and the linear velocity:

$$\frac{v_{x\_c}}{\omega_{y\_c}} = (rc)^2 \frac{\bar{f}_x}{\bar{m}_y} \text{ and } \frac{v_{z\_c}}{\omega_{y\_c}} = (rc)^2 \frac{\bar{f}_z}{\bar{m}_y}$$

Given the friction wrench on the object from the contact ($\bar{w}_c$), object velocity can be found as:

$$v_{obj}=J_c B \cdot \bar{w}_c, \ B=\text{Diag}(b,b,b(rc)^{-2}), \ b \in \mathbb{R}^+ \quad (2)$$

where $J_c$ maps the object velocity from the contact frame to the object frame.

Generalized Friction Cone:

A generalized friction cone (W) is a representation of the local Coulomb friction cone at a contact in the wrench-space and in the object frame. The generalized friction cone for a patch contact modeled with multiple point contacts is the convex hull of the generalized friction cones for each constituent contact. The friction at a pusher contact may be modeled with its generalized friction cone:

$$W_{pusher}=\{\bar{w}_{pusher}=G_p \bar{f}_p | \bar{f}_p \in FC_{pusher}\} \quad (3)$$

Here, $f_p$ is the collection of forces at the constituent point contact(s) at the pusher and $FC_{pusher}$ is the Coulomb friction cone(s) at those constituent contact(s); $G_p$ is the Jacobian that maps the local contact forces at the pusher ($f_p$) to the wrenches in the object frame; $w_{pusher}$ is the unit wrench corresponding to unit force(s) $\bar{f}_p$ inside the friction cone(s) at the constituent contact(s) of the pusher.

Dynamics of Stable Prehensile Pushing:

An object in a grasp moves following the net wrench acting on the object. Under the quasi-static assumption, which may be valid for slow pushing operations, the inertial forces on the object are negligible and there is a force balance:

$$w_{grasp}+w_{pusher}+mg=0 \quad (4)$$

Equation (4) is written in the object frame located at the center of gravity of the object, where $w_{grasp}$ is the friction wrench provided by the grasp; $w_{pusher}$ is the wrench exerted by the pusher; m is the mass of the object; and g is the gravitational force.

The present example focuses on manipulations in a parallel-jaw grasp, so the object notions are restricted in the plane of the grasp. It is assumed that there is uniform pressure distribution at the finger contacts. The normal forces at the finger contacts balance each other. All forces involved in these manipulations (friction forces at the fingers, the pusher forces, and the gravitational force) are in the plane of the grasp.

Let $G_c$ be the Jacobian that maps the finger contact wrench from the contact frame to the object frame. Both the fingers contribute equally to constitute the grasp wrench ($w_{grasp}$), i.e., $w_{grasp} = 2(G_c \cdot w_c)$. Thus, Equation (4) can be rewritten as:

$$2(\mu_c N G_c \cdot \overline{w}_c) + G_p \cdot f_p + mg = 0 \quad (5)$$

A prehensile push for which the pusher contact sticks to the object during the push is referred to herein as a stable prehensile push. For a stable prehensile push, constraint (5) is balanced by the force(s) inside the friction cone(s) at the pusher constituent contact(s):

$$2(\mu_c N G_c \cdot \overline{w}_c) + G_p \cdot f_p + mg = 0, f_p \in FC_{pusher}$$

Using (3), the previous equation can be rewritten as:

$$-2(\mu_c N G_c \cdot \overline{w}_c) - mg = k_1 \overline{w}_{pusher}$$

$$\overline{w}_{pusher} \in W_{pusher}, k_1 \in \mathbb{R}^+ \quad (6)$$

where $k_1$ is the magnitude of the pusher normal force. To find if a particular object motion can be achieved with a stable push, it can be determined whether the net required wrench falls inside the generalized friction cone of the pusher:

$$-2(\mu_c N G_c \cdot \overline{w}_c) - mg \in W_{pusher} \quad (7)$$

Dynamics of Fixtureless Fixturing:

Fixtureless fixturing may refer to a subset of stable prehensile pushes that are invariant to the object inertia, grasping force and friction parameters at the finger contacts.

The presence of gravity in Equation (6) makes the dynamics of prehensile pushing sensitive not only to the object inertia (mg), but also to the grasping force (N) and the coefficient of friction at the fingers ($\mu_c$). If the pusher is aligned such that the pusher contact normal is along the direction of gravity, the gravitational force on the object is entirely balanced by the part of the normal force at the pusher. Then the dynamics check for stable prehensile pushing (6) becomes:

$$-2(\mu_c N G_c \cdot \overline{w}_c) - k_2 \overline{w}_{pusher\_n} = k_1 \overline{w}_{pusher}$$

$$\overline{w}_{pusher} \in W_{pusher}, k_1, k_2 \in \mathbb{R}^+$$

$$-2(\mu_c N G_c \cdot \overline{w}_c) = k_1 \overline{w}_{pusher} + k_2 \overline{w}_{pusher\_n}$$

$$\overline{w}_{pusher} \in W_{pusher}, k_1, k_2 \in \mathbb{R}^+$$

where $\overline{w}_{pusher\_n}$ is the unit normal wrench at the pusher contact. It is known that $\overline{w}_{pusher\_n} \in W_{pusher}$, so the above constraint can be rewritten as:

$$-2(\mu_c N G_c \cdot \overline{w}_c) = k_3 \overline{w}_p$$

$$\overline{w}_p \in W_{pusher}, k_3 \in \mathbb{R}^+$$

Since $\mu_c$ and N are scalar constants, this constraint can be further simplified as:

$$-G_c \cdot \overline{w}_c = k_4 \overline{w}_p$$

$$\overline{w}_p \in W_{pusher}, k_4 \in \mathbb{R}^+ \quad (8)$$

Accordingly, the dynamics condition for stable prehensile pushing with gravity balancing pushers can be written as:

$$-G_c \cdot \overline{w}_c \in W_{pusher} \quad (9)$$

Notably, Equations (8) and (9) are invariant to the object inertia, grasping force and the friction coefficient at the fingers. All the object motions that satisfy Equation (9) can be achieved with fixtureless fixturing when pushing in the gravity-balancing orientation. For planning regrasps with fixtureless fixturing, rather than checking different instantaneous object motions for their validity via Equation (9), a direct bound on the feasible object motions may be more efficient.

Computation of Robust Motion Cones:

A motion cone abstracts the dynamics of pushing and provides direct bounds on the object motions that can be achieved while keeping the pusher contact sticking to the object. The idea of the motion cone is extended to fixtureless fixturing below. In particular, the problem to be solved is to find a set of instantaneous object motions that can be achieved with fixtureless fixturing. This is equivalent to finding a set of object motions that satisfy the constraint of Equation (9). To find a motion cone, a set of support contact wrenches ($w_c$) is found that satisfies Equation (9) and then this wrench-set ($W_c$) is mapped to a set of object twists. This object twist-set is denoted by $\nabla_{obj}$ and called robust motion cone.

From the constraint of Equation (9) it can be observed that $-G_c \cdot W_c = W_{pusher}$ or $W_c = -\tilde{G}_c \cdot W_{pusher}$ where $\tilde{G}_c$ is the Jacobian that maps wrenches from the object frame to the finger contact frame. From the definition in Equation (3), $W_{pusher}$ is convex and polyhedral. Therefore, $\overline{W}_c$ and $\nabla_{obj}$ are also convex and polyhedral. The generators of the robust motion cone $\nabla_{obj}$ can be computed by a linear mapping of the generators of the generalized friction cone of the pusher $W_{pusher}$.

A procedure to compute a robust motion cone may include:

1. Solve $\overline{w}_c = -\tilde{G}_c \cdot \overline{w}_p$ for $\overline{w}_p$ equal to every edge of the generalized friction cone $W_{pusher}$.
2. Define the set of $\overline{w}_c$ computed in step 1 as the generators/edges of the wrench-set $\overline{W}_c$.
3. Map $\overline{W}_c$ to the object twist space using Equation (2) to obtain the robust motion cone $\nabla_{obj}$.

Application of Fixtureless Fixturing to Regrasp Planning:

In this Example, the application of fixtureless fixturing to regrasp planning is discussed. A sampling-based planning framework is presented that uses the knowledge of robust motion cones to generate a tree of grasps that can be reached with textureless fixturing. A path in this tree is a pushing strategy to regrasp an object in the gripper through a series of robust stable prehensile pushes.

The high-level planning framework was based on T-RRT*—an optimal sampling based method for planning on configuration space cost-maps. However, other appropriate sampling strategies could also be used. For selective sampling, the T-RRT* framework uses a transition test and filters the sampled configurations to prefer the exploration in low configuration-cost regions. The configuration cost was defined as the distance from the goal. The transition test gave preference to the stochastic exploration towards the goal grasp, while allowing the flexibility to move the object away from the goal if that was necessary to move the object finally to the goal.

For effective connections, T-RRT* exploits the underlying RRT* framework to make and rewire the connections in the tree such that the cost of the nodes may be reduced. The cost of a node may be defined as the sum of the cost of the parent node and the cost to push the object to the sampled node. The cost of a push is 0.1 if the parent node uses the same pusher as the child and 1 otherwise. However, other possible costs could be used as the disclosure is not so limited.

In practice, every time a pusher contact is changed, it introduces a possibility to add noise to the system. Thus, reducing the pusher switch-overs can add to the robustness of the manipulations planned. With the node cost definition, the planner may try to reduce the number of pusher switch-overs used to push the object to the desired pose.

Algorithm 1 below shows the presently disclosed in-hand manipulation planner. Let q be a configuration of an object, i.e., the pose of the object in the gripper frame that is fixed in the world. In the present Example, manipulations were considered in a parallel-jaw grasp, so the configuration space C is $[X,Z,\theta_y] \in \mathbb{R}^3$. The object can translate in the grasp plane (XZ plane) and rotate around a perpendicular to the grasp plane (Y axis).

Let $q_{init}$ and $q_{goal}$ be an initial and desired pose of the object in the grasp frame, respectively. The planner initiates a tree T with $q_{init}$ and generates robust motion cones at it.

---
Algorithm 1: In-Hand Manipulation Planner
--- input : $q_{init}$, $q_{goal}$
output : tree $\mathcal{T}$
  $\mathcal{T} \leftarrow$ initialize tree($q_{init}$)
  generate_robustCones($\mathcal{T}$, $q_{init}$)
  while $q_{goal} \notin \mathcal{T}$ or cost($q_{goal}$) > cost threshold do
    $q_{rand} \leftarrow$ sample random configuration($C$)
    $q_{parent} \leftarrow$ find nearest neighbor($\mathcal{T}$, $q_{rand}$)
    $q_{sample} \leftarrow$ take unit step($q_{parent}$, $q_{rand}$)
    if $q_{sample} \notin \mathcal{T}$ then
      if transition test($q_{parent}$, $q_{sample}$, $\mathcal{T}$) then
        $q_{new} \leftarrow$ robust_push ($q_{parent}$, $q_{sample}$)
        if transition test($q_{parent}$, $q_{new}$, $\mathcal{T}$) and grasp maintained($q_{new}$) then
          $q^*_{parent} \leftarrow$ optimEdge($\mathcal{T}$, $q_{new}$, $q_{parent}$)
          add new node($\mathcal{T}$, $q_{new}$)
          add new edge($q^*_{parent}$, $q_{new}$)
          generate_robustCones($\mathcal{T}$, $q_{new}$)
          rewire tree($\mathcal{T}$, $q_{new}$, $q^*_{parent}$)

While the goal pose was not reached within some cost threshold, a random configuration ($q_{rand}$) was sampled. A nearest configuration ($q_{parent}$) to $q_{rand}$ in the tree T was found, and a unit-step object pose ($q_{sample}$) towards the grand was computed. Using the transition test, the planner evaluated whether a move from the parent node $q_{parent}$ to $q_{sample}$ was beneficial or not. If it was beneficial, the robust_push routine computed an object configuration ($q_{new}$) closest to $q_{sample}$ that can be reached using the robust motion cones at $q_{parent}$. The node $q_{new}$ was added to the tree such that the node costs of $q_{new}$ and the nodes near $q_{new}$ were lowered if possible. The robust motion cones were generated for every new node added to the tree.

The functions generate_robustCones and robust_push in Algorithm 1 were two routines for the regrasp planning using fixtureless fixturing. generate_robustCones computed polyhedral robust motion cones for a given object configuration in the grasp using the procedure explained hereinabove. At every node, the number of motion cones was the same as that of the pushers. robust_push found an object pose closest to the sampled pose ($q_{sample}$) that could be reached with fixtureless fixturing. This computation was done using the robust motion cones at the parent node ($q_{parent}$), which provided the knowledge of local reachability. If the object twist needed from $q_{parent}$ to $q_{sample}$ was inside any of the robust motion cones, the sampled pose could be reached from $q_{parent}$. If the required object twist was outside all the motion cones, a twist that was inside one of the motion cones and closest to the desired twist is selected.

The motion cone based unit-step propagation and T-RRT* based high-level framework worked together to rapidly explore the configuration space of different grasps and generated pushing strategies for the desired in-hand manipulation. All the manipulation plans generated by the planner were invariant to the object inertia, grasping force and friction coefficient at the fingers.

Regrasp Examples and Experimental Validation:

The manipulation planner described above was validated with regrasping tasks in simulation and experiments. The experiments were performed on a manipulation platform instrumented with an industrial robot arm, a parallel jaw gripper with force control, and a Vicon system for object tracking as detailed below.

Simulation and Experimental Setup:

Different regrasp tasks were considered for the objects listed in Table I. A parallel-jaw gripper with flat circular finger contacts was used. The planner was initiated with pusher contacts on either sides of the object and under the object. In practice, all these contacts may be implemented using a single feature in the environment.

The initial pose of the object was treated as [0,0,0], and the goal poses for different regrasp examples are listed in Table II. The plan time for each regrasp, shown in Table II, was the median time in seconds over 10 planning trials. A computer with an Intel Core i7 2.8 GHz processor and MATLAB R2017a was used for all the computations and planning.

TABLE I

Physical properties of the objects used

| Shape | Material | Dim. [L, B, H] (mm) | Mass (g) |
|---|---|---|---|
| square prism | Al 6061 | 100, 25, 25 | 202 |
| rectangular prism | Delrin | 80, 25, 38 | 130 |
| T-shaped | ABS | 70, 25, 50 | 62 |

Regrasp Example: Regrasping an Object Offset to the Center:

The goal in this example was to regrasp the square prism 20 mm offset from the center in the horizontal direction. The gripping force and frictional parameters at the fingers and at the features in the environment were chosen such that pushing the object horizontally from the side will not be a valid solution. Due to the gravitational force, the object was positioned such that it would also slide downwards by a few millimeters if pushed from the side.

Figure 6:
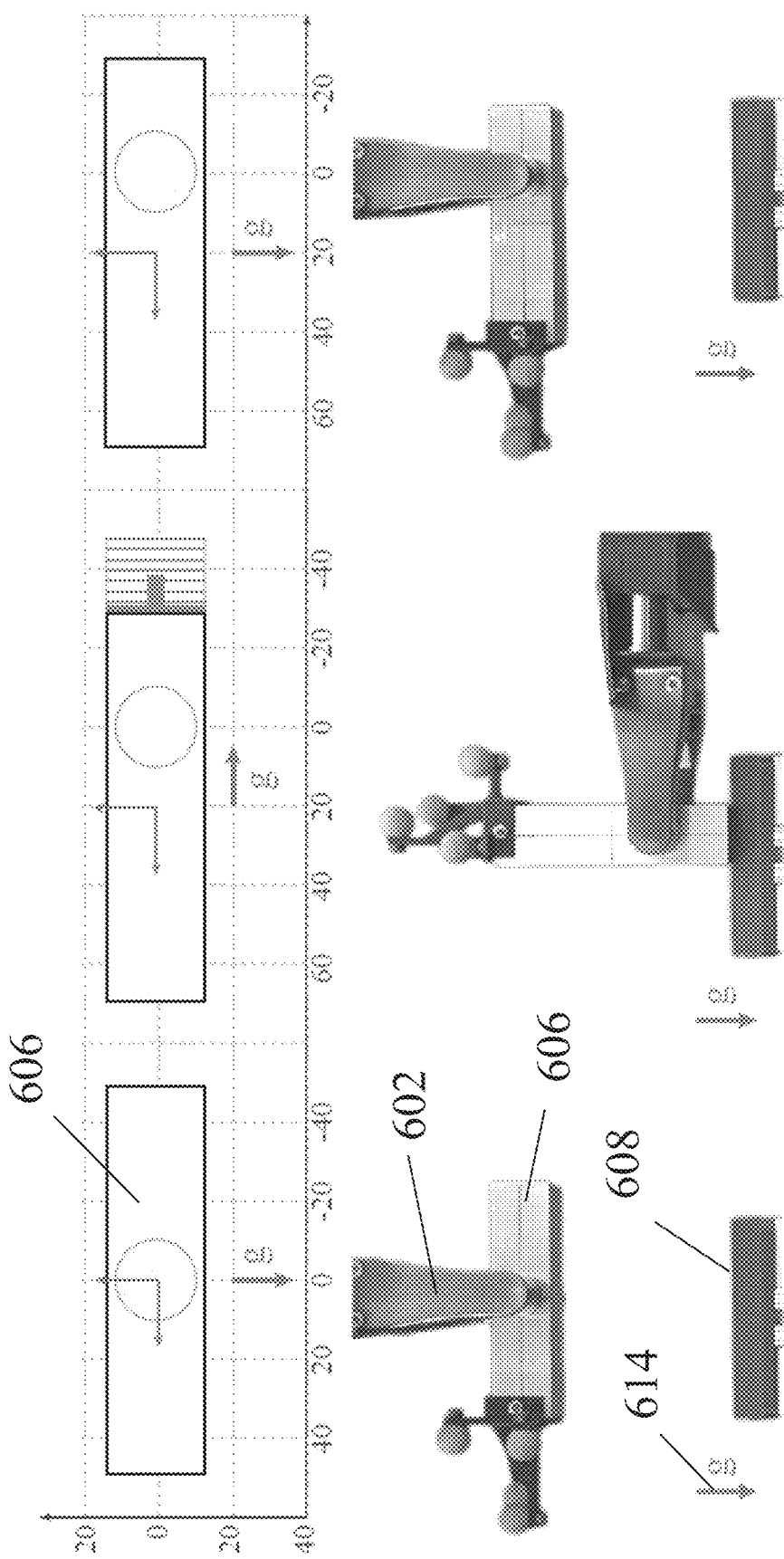
FIG. 6 depicts a sequence of displacements applied to a gripper to change a grip on an object, according to one example.

As shown in the simulated motion trajectory and object motion snapshots depicted in FIG. 6, the planner proposed herein rotated the gripper 602 such that the object 606 was pushed from a side face but used the horizontally oriented surface 608 as the pusher. The simulation plots depict pushes applied to the object by the surface in the reference frame of the object. The gravitational force 614 on the object was oriented along the pusher contact normal and the regrasp was achieved using fixtureless fixturing. This strategy is simpler and more robust as compared to regrasping strategies using different orientations of the object and multiple pushers relative to gravity for the same problem (e.g. pushers proximate the side and bottom faces of the object). Accordingly, using the planner proposed herein, no contact switch-over was needed for the desired regrasp as shown in FIG. 6. Moreover, the time taken to plan such a strategy was 5 to 1500 times faster than the alternative strategy noted above.

Figure 7:
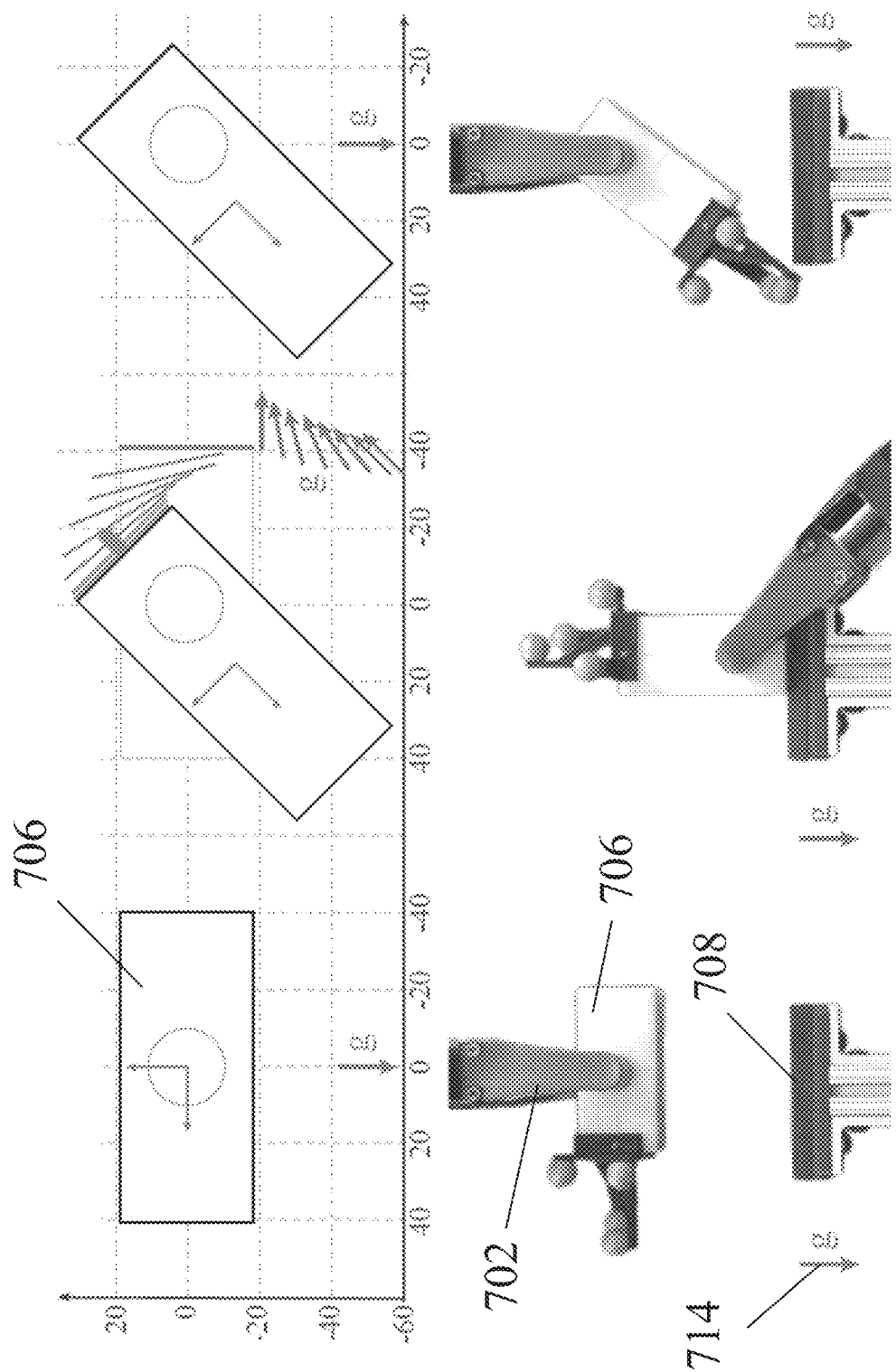
FIG. 7 depicts a sequence of displacements applied to a gripper to change a grip on an object, according to another example.

Regrasp Example: General Manipulation in [X,Z,θ$_y$]:

The following example demonstrates large in-hand manipulation for a rectangular prism, involving both displacement and rotation of the fingers of a gripper relative to the object while the object is held by the gripper. The above described planner quickly converged to a strategy which did not require any pusher switch-over. Thus, the knowledge of motion cones allowed the planner to reason about the various feasible motions that can be made instantaneously and to choose the motion that best moved the object towards the goal position and orientation. FIG. 7 shows the simulated motion of the object 706 and snapshots from the experimental run based on the pushing strategy generated by the planner described herein. In the simulation, the direction of gravity 714 remained constant in the pusher frame as the pusher was a fixed surface 708 in the environment disposed vertically below the object.

Figure 8:
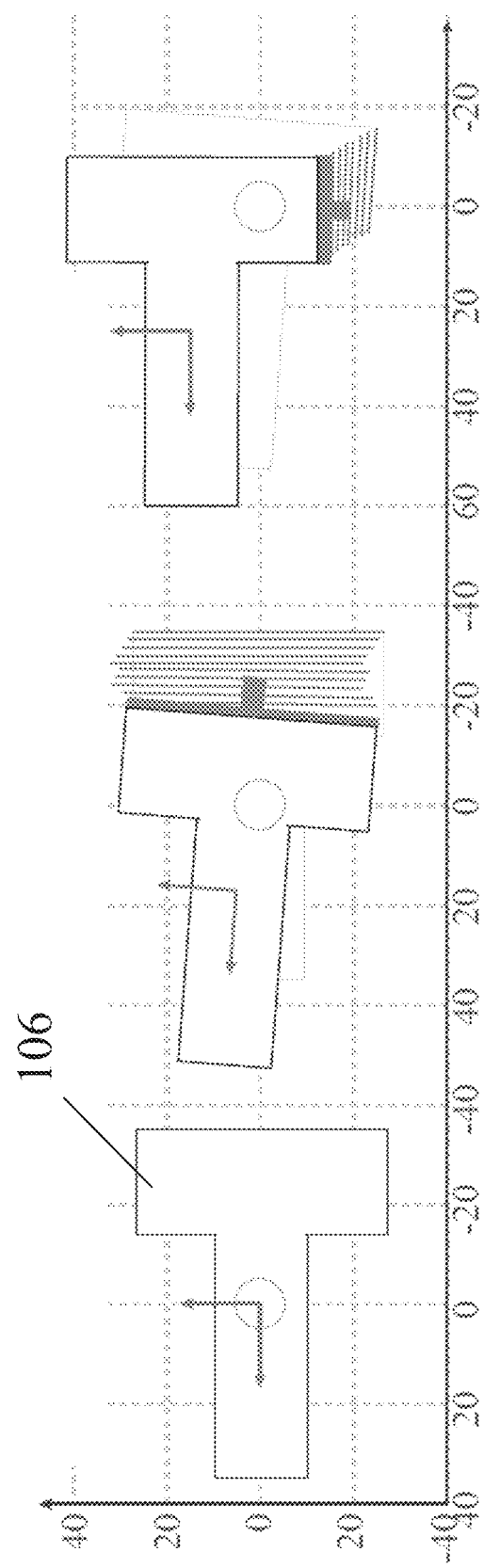
FIG. 8 depicts a sequence of simulated displacements to change a grip on a t-shaped object, according to one example.

Regrasp Example: Manipulation with a Complex Non-Convex Object:

In this example, manipulation of a T-shaped object is demonstrated. Manipulating such a non-convex object is particularly hard, because pushing the object directly towards the goal may lead to losing the grasp on the object. The long horizon planning feature of the planner and the capability to reason about discreetly changing the pushers are useful for regrasping such an object. As shown in FIGS. 1 and 8, the presently disclosed planner generates a strategy that respects the object shape and corresponding geometric constraints. The planner utilizes frictional pushes applied to two different sides of the object which were oriented during movement such that the surface normal was aligned with a direction of gravity for moving the object to the goal grasp.

TABLE II

Planning times (in seconds) with different methods for unit-step propagation

| Manipulation | Goal [X, Z, θ$_Y$] | Plan Time (s) |
| --- | --- | --- |
| Horz. offset (low μ) | 20, 0, 0 | 0.39 |
| [X, Z, θ$_Y$] Regrasp | 15, −13, 45 | 0.65 |
| T-shaped | 25, 17.5, 0 | 0.60 |

Some of the key characteristics of fixtureless fixturing are highlighted below based on the above-described examples. Multiple runs of the pushing strategies were carried out for different grasping forces and the object motion in the grasp was recorded.

The experimental data shows that the object moves a minimal amount with respect to the environment during the planned regrasps. From the mechanics of robust stable prehensile pushing, it is expected that the object sticks to the environment during the regrasps.

Figure 9A:
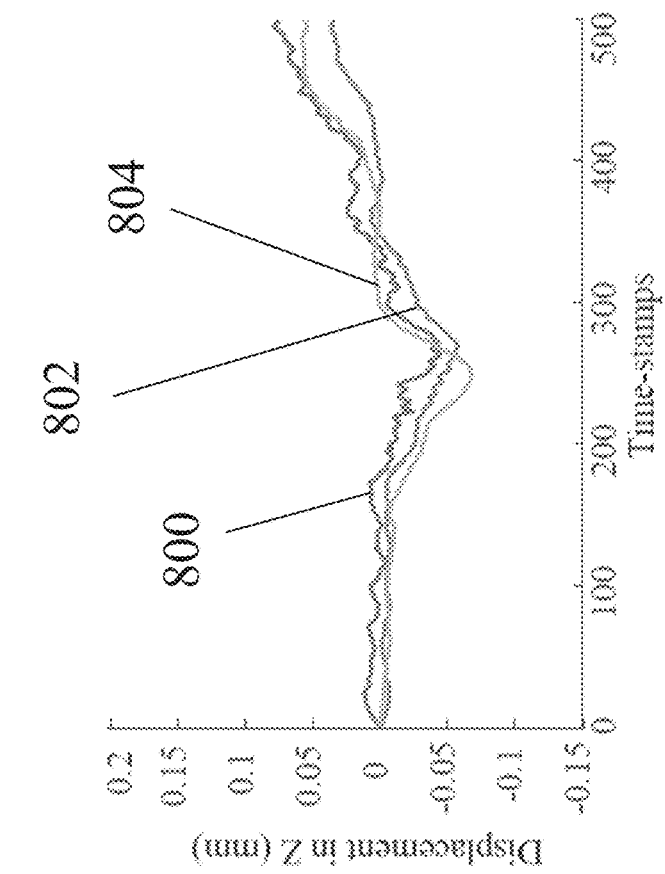
FIGS. 9A and 9B show the displacement of the object relative to the surface for the example of FIG. 6.
Figure 9B:
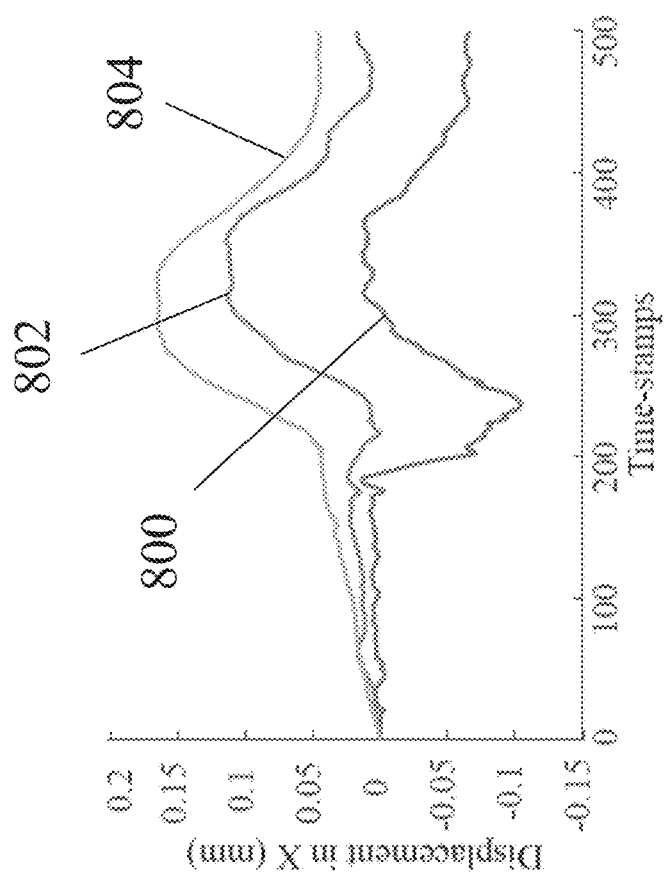
Figures 10A, 10B:
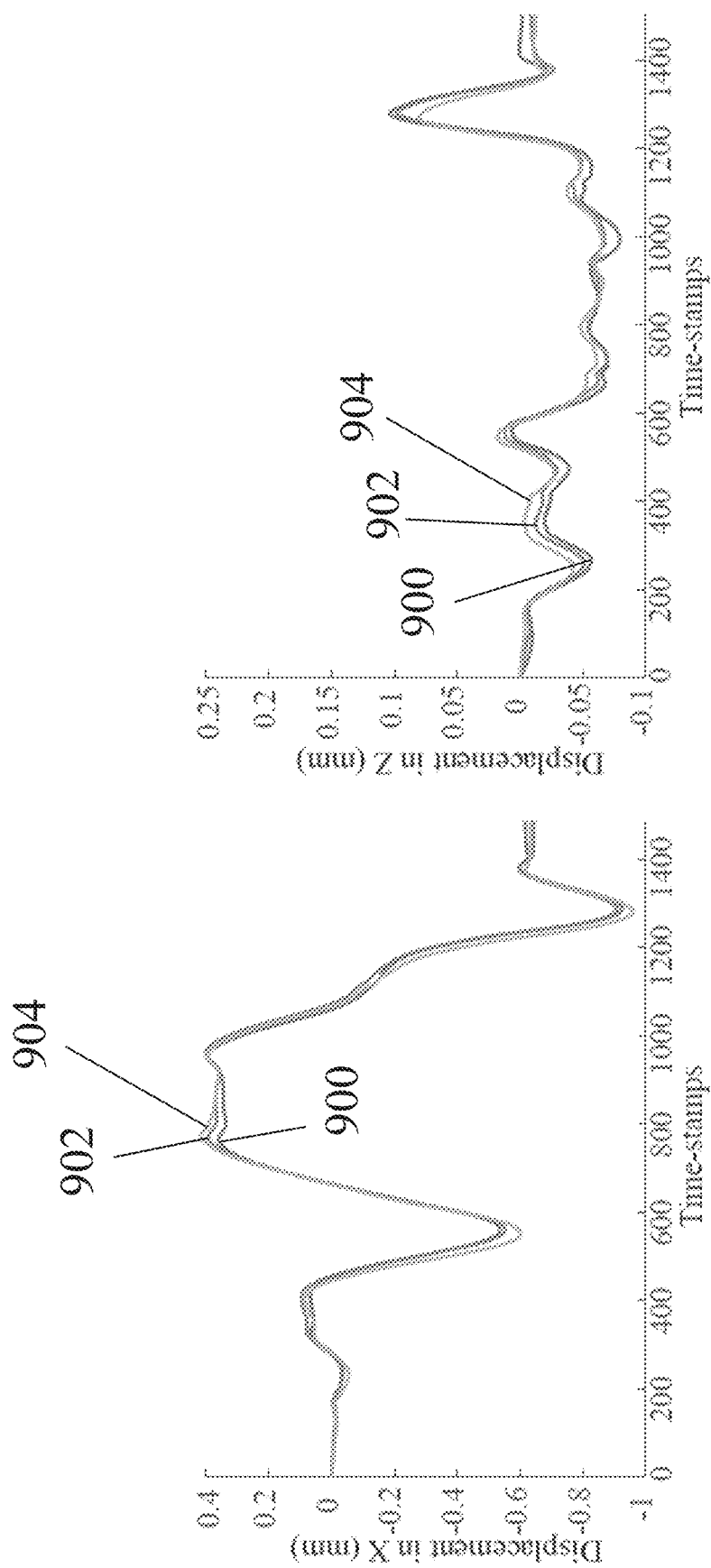
FIGS. 10A and 10B show the displacement of the object relative to the surface for the example of FIG. 7.

In particular, FIGS. 9A-9B show the displacement of the object observed during the pushing strategy shown in FIG. 6. Displacements are plotted for a 25 N grip force 800, a 30 N grip force 802, and a 35 N grip force 804. The displacement in the X (FIG. 9A) direction was less than ±0.2 mm, whereas that in the Z direction was even smaller, less than ±0.1 mm (FIG. 9B). These values are close to the precision level of the Vicon object tracking system, so some of the object displacement can be attributed to the noise from the camera system. Similarly, FIGS. 10A and 10B show the displacement of the object during the pushing strategy shown in FIG. 7. Displacements are plotted for a 25 N grip force 900, a 30 N grip force 902, and a 35 N grip force 904. The object moved during the regrasp by a very small amount, less than 3% of the object displacement applied for this regrasp.

A minimal effect is observed on the outcome of the regrasp actions planned with fixtureless fixturing when the friction at the fingers was changed. As the grasping force changes, the friction force at the fingers change. However, as seen in the plots in FIGS. 9A-9B and 10A-10B, the variation in the outcome of the pushing strategy for three different grasping forces was negligible. This supports the invariance expected from fixtureless fixturing.

The repeatability and robustness of the pushing actions allowed the robot to place the T-shaped object after every regrasp and restart the next run autonomously twenty times in a row. The T-shaped object did not have Vicon markers on it for tracking. Twenty runs for the manipulation shown in FIG. 1 were performed in a sequence in an open-loop fashion with different grasping forces.

For all the examples discussed in connection with the Regrasp Examples above, a single feature in the environment was sufficient to manipulate different objects. Thus, the disclosed methods for fixtureless fixturing allows robots to use a simple feature such as a supporting surface as a "universal" fixture for different objects and different regrasping tasks.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention. All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computing device or distributed among multiple computing devices. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computing device may be embodied in any of a number of forms, such as a rack-mounted computer, a desktop computer, a laptop computer, or a tablet computer. Additionally, a computing device may be embedded in a device not generally regarded as a computing device but with suitable processing capabilities, including a Personal Digital Assistant (PDA), a smart phone, tablet, or any other suitable portable or fixed electronic device.

Also, a computing device may have one or more input and output devices. These devices can be used, among other things, to present a user interface. Examples of output devices that can be used to provide a user interface include display screens for visual presentation of output and speakers or other sound generating devices for audible presentation of output. Examples of input devices that can be used for a user interface include keyboards, individual buttons, and pointing devices, such as mice, touch pads, and digitizing tablets. As another example, a computing device may receive input information through speech recognition or in other audible format.

Such computing devices may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, RAM, ROM, EEPROM, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form, Such a computer readable storage medium or media can be transportable, such that the program or programs stored thereon can be loaded onto one or more different computing devices or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computing device or other processor to implement various aspects of the present disclosure as discussed above. Additionally, it should be appreciated that according to one aspect of this embodiment, one or more computer programs that when executed perform methods of the present disclosure need not reside on a single computing device or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

The embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

What is claimed is:

1. A method for changing a grip on an object, the method comprising:
    manipulating an object with a gripper of a robotic system to bring a first portion of the object into contact with a supporting surface vertically below the object;
    displacing the gripper relative to the supporting surface and relative to the object, wherein the gripper maintains contact with the object during the displacement and applies a frictional force to the object during the displacement; and
    maintaining the object substantially stationary relative to the supporting surface during displacement of the gripper.

2. The method of claim 1, wherein a direction normal to the supporting surface is substantially parallel to a direction of a gravitational force acting on the object.

3. The method of claim 1, wherein contact between the first portion of the object and the supporting surface defines a first contact area, and wherein an axis extending between two contacts of the gripper with the object is located within a volume extending vertically above the first contact area.

4. The method of claim 1, further comprising applying a force to the object with the gripper, wherein the force is at least partially directed towards the supporting surface.

5. The method of claim 4, wherein a majority of the force is directed towards the supporting surface.

6. The method of claim 5, wherein substantially all of the force is directed towards the supporting surface.

7. The method of claim 1, further comprising repeating the steps of displacing the gripper relative to the supporting surface and relative to the object and maintaining the object substantially stationary relative to the supporting surface during displacement of the gripper with the first portion of the object in contact with the supporting surface.

8. The method of claim 1, further comprising manipulating the object with the gripper to move the first portion of the object out of contact with the supporting surface and to bring a second portion of the object into contact with the supporting surface.

9. The method of claim 8, further comprising repeating the steps of displacing the gripper relative to the supporting surface and relative to the object and maintaining the object substantially stationary relative to the supporting surface during displacement of the gripper with the second portion of the object in contact with the supporting surface.

10. The method of claim 1, wherein the gripper is constructed and arranged to contact the object at two or more contact points.

11. The method of claim 1, wherein the supporting surface supports the weight of the object during displacement of the gripper.

12. The method of claim 1, wherein the supporting surface is stationary during movement of the gripper.

13. A system for changing a grip on an object, the system comprising:
    a gripper constructed and arranged to contact and grip an object at two or more contact points;
    an actuator constructed and arranged to control movement of the gripper; and
    a processor in communication with the actuator, wherein the processor is configured to control the actuator to:

manipulate the object with the gripper to bring a first portion of the object into contact with a supporting surface vertically below the object;

displace the gripper relative to the supporting surface and relative to the object, wherein the gripper maintains contact with the object during the displacement and applies a frictional force to the object during the displacement; and maintain the object substantially stationary relative to the supporting surface during displacement of the gripper.

14. The system of claim 13, wherein the supporting surface is stationary.

15. The system of claim 13, wherein a direction normal to the supporting surface is substantially parallel to a direction of a gravitational force acting on the object.

16. The system of claim 13, wherein contact between the first portion of the object and the supporting surface defines a first contact area, and wherein an axis extending between two contacts of the gripper with the object is located within a volume extending vertically above the first contact area.

17. The system of claim 13, wherein the processor is configured to control the actuator to apply a force to the object with the gripper, wherein the force is at least partially directed towards the supporting surface.

18. The system of claim 17, wherein a majority of the force is directed towards the supporting surface.

19. The system of claim 18, wherein substantially all of the force is directed towards the supporting surface.

20. The system of claim 13, wherein the processor is configured to control the actuator to repeat the steps of displacing the gripper relative to the supporting surface and relative to the object and maintaining the object substantially stationary relative to the supporting surface during displacement of the gripper with the first portion of the object in contact with the supporting surface.

21. The system of claim 13, wherein the processor is configured to control the actuator to manipulate the object with the gripper to move the first portion of the object out of contact with the supporting surface and to bring a second portion of the object into contact with the supporting surface.

22. The system of claim 21, wherein the processor is configured to control the actuator to repeat the steps of displacing the gripper relative to the supporting surface and relative to the object and maintaining the object substantially stationary relative to the supporting surface during displacement of the gripper with the second portion of the object in contact with the supporting surface.

23. The system of claim 13, wherein the supporting surface supports the weight of the object during displacement of the gripper.

24. A method for changing a grip on an object, the method comprising:

determining a set of physically possible and stable displacements for moving a gripper of a robotic system relative to an object while a first portion of the object is held by the gripper against a surface underlying the object, wherein each displacement of the set of displacements is invariant to a density of the object and a friction force between the gripper and the object; and applying a displacement to the gripper relative to the object according to one of the set of physically possible and stable displacements to frictionally push the object relative to the gripper.

25. The method of claim 24, wherein contact between a portion of the object and the surface while the object is held against the surface defines a contact area, and wherein each displacement of the set of displacements is executed with an axis extending between two contacts of the gripper with the object located within a volume extending vertically above the contact area.

26. The method of claim 24, wherein determining the set of physically possible and stable displacements comprises generating a robust motion cone comprising physically possible and stable displacements of the gripper relative to the object while maintaining the object in substantially stationary contact with the surface.

27. The method of claim 26, wherein a direction normal to the surface is substantially parallel to a direction of a gravitational force acting on the object.

28. The method of claim 26, further comprising iteratively sampling from the set of physically possible and stable displacements to choose a displacement to apply to the gripper relative to the object.

29. The method of claim 28, wherein iteratively sampling comprises random sampling.

30. The method of claim 29, wherein random sampling comprises prioritizing samples according to a cost-analysis system.

31. The method of claim 24, wherein determining the set of physically possible and stable displacements includes determining that a rotation of the object relative to the surface is required to achieve a desired movement of the gripper relative to the object.

32. The method of claim 31, further comprising rotating the object and contacting a second portion of the object against the surface after determining that a rotation of the object relative to the surface is required.

33. The method of claim 24, further comprising generating a sequence of displacements based on the physically possible and stable displacements, and executing the sequence of displacements to move the gripper from an initial position to a target position relative to the object.

* * * * *